Nov. 2, 1971     SUSUMU FUJITA     3,616,738
CAMERA WITH A RETRACTABLE LENS BARREL
Filed Dec. 5, 1969

INVENTOR
SUSUMU FUJITA

BY *Sughrue, Rothwell, Mion, Zinn & Macpeak*

ATTORNEYS

United States Patent Office 3,616,738
Patented Nov. 2, 1971

3,616,738
CAMERA WITH A RETRACTABLE LENS BARREL
Susumu Fujita, Nishinomiya-shi, Japan, assignor to Fuji Photo Film Co., Ltd., Kanagawa, Japan
Filed Dec. 5, 1969, Ser. No. 882,796
Claims priority, application Japan, Dec. 6, 1968, 43/89,700
Int. Cl. G03b *17/04*
U.S. Cl. 95—39                                    3 Claims

ABSTRACT OF THE DISCLOSURE

A retractable lens barrel is connected with a lever which is turned according to rotation of a cam. The cam is actuated by operating the film wind-up lever.

BACKGROUND OF THE INVENTION

Field of the invention

The present invention relates to a camera having a retractable lens barrel, and in particular to a camera, the lens barrel of which is retracted into the camera body when the camera is not being used.

Description of the prior art

In conventional cameras, retractable lens barrels are generally withdrawn for use manually. In another type of camera having a retractable lens utilizing a bellows, the lens is also drawn forward manually for use. These cameras are known to have certain advantages in that the camera is easily handled with the lens barrel retracted for carrying.

Nevertheless, such conventional cameras have the disadvantage that they are difficult to use for snap shots, since the actual taking of the picture and the withdrawal of the lens barrel must be performed as separate operations. Further, sometimes the photographer forgets to withdraw the lens barrel before taking pictures.

SUMMARY OF THE INVENTION

Accordingly, the principal object of the present invention is to provide a camera with a retractable lens barrel wherein the lens barrel is automatically withdrawn from the camera body in response to the turning of the film take-up lever, thus avoiding the necessity of separate operations during the picture taking process and rendering it impossible for the photographer to forget to remove the lens barrel from its retracted position.

This object is accomplished in the following manner. The film takeup lever of most conventional cameras has an initial play angle over which the lever can be freely turned without operating either the film take-up spool or any other operation normally performed by this lever within the camera. The lever actually operates to move the film only after it is turned to the end of this play angle.

The present invention utilizes movement of the take-up lever over this angle to operate the withdrawal of the lens barrel. In the camera of the present invention, film take-up lever is connected to a cam element which is in turn connected to a lens barrel operating lever connected to the lens barrel so as to withdraw and retract the lens barrel. Thus, by turning the film take-up lever, the lens barrel is withdrawn from its retracted position.

DESCRIPTION OF THE PREFERRED EMBODIMENT

Figure 1:
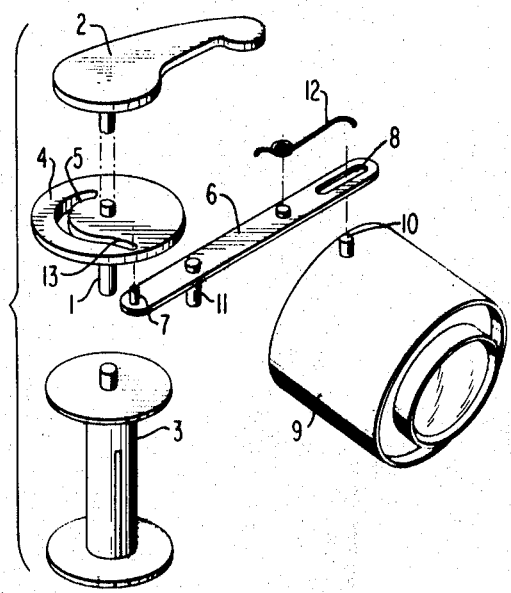
FIG. 1 is an exploded, perspective view showing an embodiment of the camera in accordance with the present invention.
Figure 2:
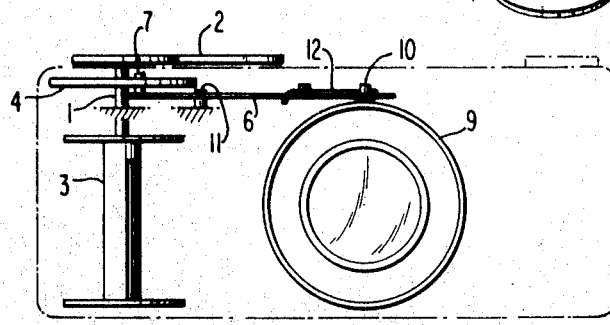
FIG. 2 is a front, elevational view of the same.

Now referring to FIG. 1, the film take-up lever 2 is connected with a cam element 4 fixed thereto. The cam element 4 is provided with an arcuate slot 5 terminating in a radially offset slot portion defining an engaging end 13. The take-up lever 2 and the cam element 4 are rotated about the same axis as the film take-up spool 3. In slot 5 of the cam element 4 is inserted a pin 7 which is fixed to an end of lever 6 pivotally mounted to a fixed pivot 11 in the camera. On the other end of the lever 6, a slot 8 is provided. Into slot 8, a pin 10, fixed at the back portion of the lens barrel 9 is inserted. Thus, film take-up lever 2 is connected with the lens barrel through cam element 4, and lever 6.

When operating the camera in accordance with the present invention as constructed above, the turning of the film take-up lever 2 causes forward movement of lens barrel 9.

Figure 3:
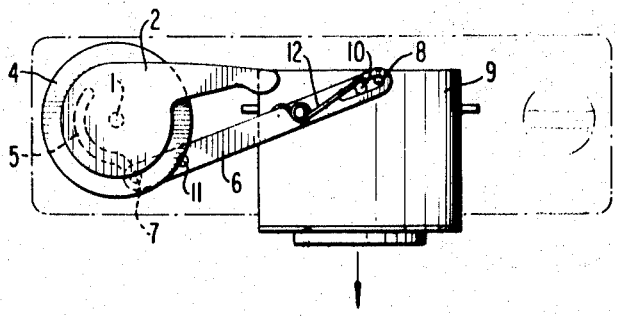
FIG. 3 is a plan view of the same.
Figure 4:
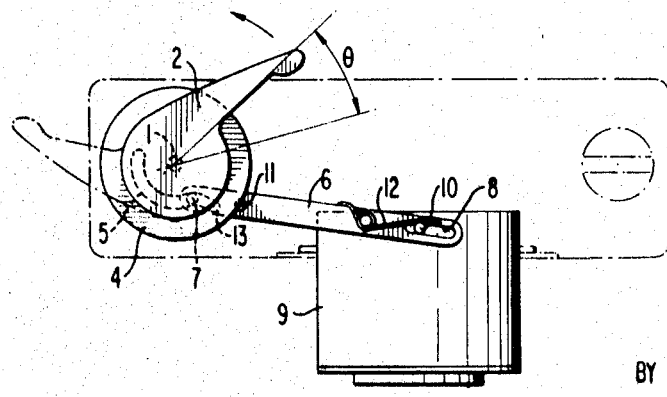
FIG. 4 is a plan view of the same showing the operation of the construction in accordance with the present invention.

When film take-up lever 2 is turned through the initial play angle $\theta$, cam element 4, fixed to lever 2, is also turned at the same time. With the turning of the cam element, the lever 6, whose pin 7 is engaged with cam element slot 5, is turned in a clockwise direction about pivot 11. Therefore, lens barrel 9, whose pin 10 is in engagement with slot 8 of lever 6, is moved forward and the lens barrel is withdrawn from the camera body, as shown by the arrow in FIG. 3.

Lens barrel 9, having been moved forward is fixed at a predetermined position by means of a spring 12 mounted to lever 6. Pin 7 is engaged with slot 5 at the arcuate portion thereof after film take-up lever 2 is turned to the end of the play angle. Accordingly, lever 6 is no longer turned by the rotation of cam element 4 by the rotation of film take-up lever 2, since pin 7 will now slide along arcuate slot 5. Thus, the film is taken up as in the conventional camera after the film take-up lever is turned to the end of the play angle. Therefore, the film take-up operation is the same as in conventional cameras. In order to retract the projected lens barrel 9 after photographing, film take-up lever 2 is turned back to the initial position. That is, by turning the film take-up lever 2 to its original position, cam element 4 rotates backward as well and pin 7 is guided back into the engaging end 13 of slot 5 to move lens barrel 9 back by the movement of lever 6 in the counterclockwise direction.

As described above, the invention provides simple camera construction enabling the automatic withdrawal and retraction of retractable lens barrel 9. Further, in accordance with the present invention, the lens barrel movement is carried out by merely rotating the film take-up lever. Therefore, by employing the camera in accordance with the present invention, there can be no failure in taking pictures arising from the photographer forgetting to withdraw the lens barrel to get a focused image on the film. Moreover, the camera according to this invention may be operated much more easily and quickly and it is therefore very easy to take a snap shot.

What is claimed is:

1. A photographic camera with a retractable lens and comprising a film take-up lever movable through an initial play angle, a cam element fixed to said film take-up lever, a second lever following said cam element, and a retractable lens barrel connected with said second lever, whereby said lens barrel is withdrawn in response to the movement of said film take-up lever through its initial play angle.

2. A camera with a retractable lens barrel as claimed in claim 1 wherein said cam element is provided with an arcuate slot having a radially offset slot portion defining an engaging end and wherein a pin fixed on one end of said second lever is in engagement with said slot.

3. A camera with a retractable lens barrel as claimed in claim 2 wherein said second lever is provided with a slot at the opposite end thereof from said pin to receive a pin fixed on the rear of said lens barrel.

References Cited

UNITED STATES PATENTS

| | | | |
|---|---|---|---|
| 2,208,799 | 7/1940 | Lessler et al. | 95—39 |
| 2,759,405 | 8/1956 | Harter | 95—39 X |
| 2,839,976 | 6/1958 | Mamiya | 95—31 |
| 3,504,605 | 4/1970 | Scudder et al. | 95—39 X |

JOHN M. HORAN, Primary Examiner

T. A. MAURO, Assistant Examiner

U.S. Cl. X.R.

95—11